United States Patent Office 3,283,154
Patented Nov. 1, 1966

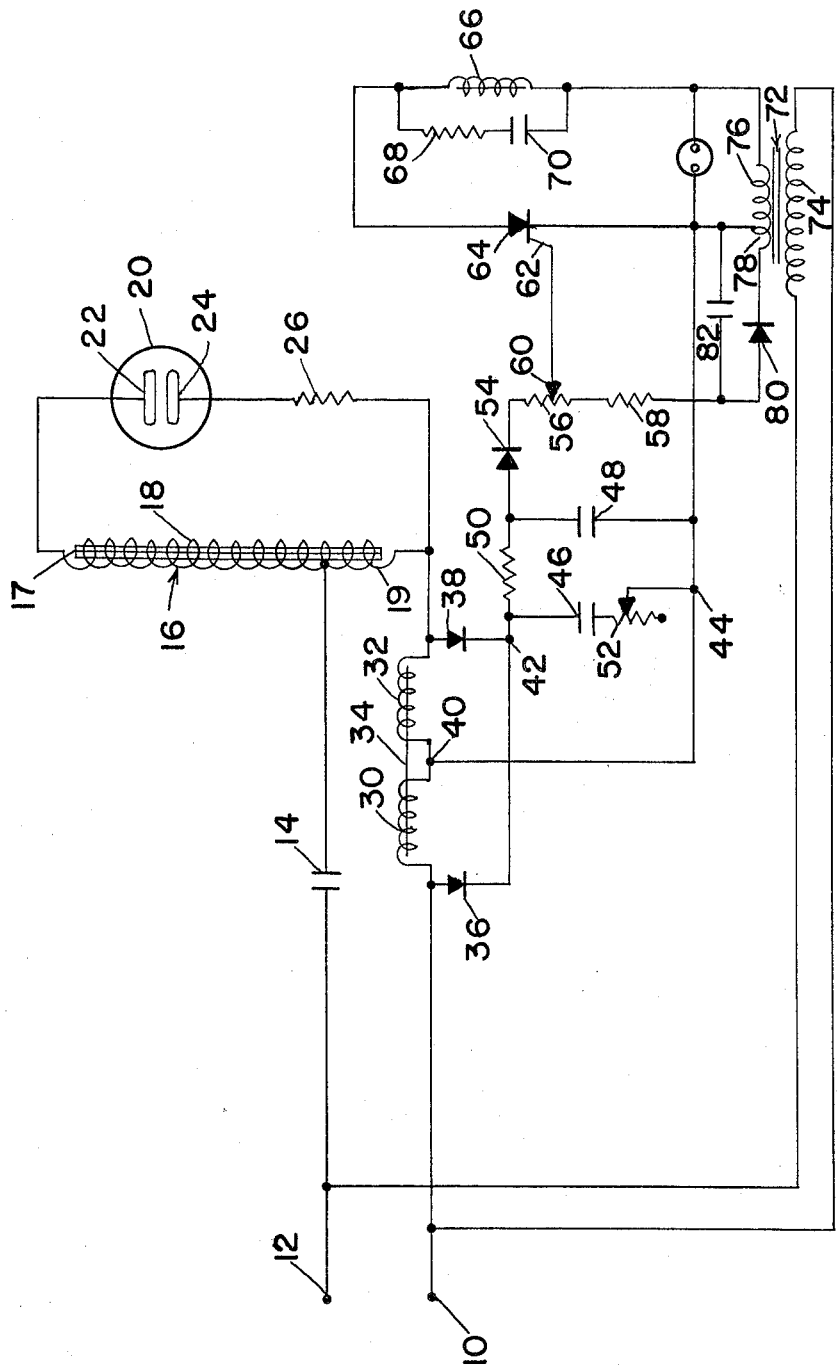

3,283,154
FLAME DETECTOR SYSTEM USING AN ULTRAVIOLET DETECTOR OF THE AVALANCHE DISCHARGE TYPE
Philip Giuffrida, North Andover, and John Pratt, Braintree, Mass., assignors to Electronics Corporation of America, Cambridge, Mass., a corporation of Massachusetts
Filed Feb. 21, 1963, Ser. No. 260,126
18 Claims. (Cl. 250—83.6)

This invention relates to radiation detection apparatus and more particularly to improvements in radiation detection circuitry for deriving pulse signals, which are particularly useful with avalanche breakdown type of devices and for employment in combustion supervision systems.

Flame detection and particularly the supervision of combustion requires a sensor which provides a positive indication of the presence or absence of the flame. Among the suitable sensors that are utilized is a sensor responsive to a particular range of ultraviolet frequencies such as a Geiger Mueller type of tube configuration in which a breakdown between electrodes occurs in response to radiation impinging on one of the electrodes which produces a photoelectron. Such devices are operated at relatively high voltages, which voltages should be accurately regulated as the tube will not break down in avalanche discharge at all if the voltage is not high enough and will break down in a self-sustaining discharge if the voltage is excessive. In addition, when breakdown occurs sufficient energy must be supplied to provide a reliably detectable output signal. Also it is necessary, particularly in combustion control apparatus, to provide means that reliably couple signals produced in response to incident radiation to suitable indicating and/or control circuitry.

Accordingly, it is an object of this invention to provide a novel and improved energizing circuit for combustion supervision devices employing detectors of the avalanche breakdown type.

Another object of this invention is to provide noval and improved readout control circuitry particularly adapted for use with a radiation detector of the avalanche breakdown type.

A further object of the invention is to provide a novel and improved energy source particularly useful with avalanche breakdown devices which supplies a regulated output voltage to a high impedance load but which loses its voltage regulating characteristics when the impedance of the load is sharply reduced.

Still another object of the invention is to provide a novel and improved ultraviolet radiation sensor energizing circuit which supplies a regulated high voltage to the sensor and upon detection of ultraviolet radiation by the sensor rapidly produces a quenching voltage condition to restore the sensor to its initial condition.

A further object of the invention is to provide novel and improved circuitry for coupling to output circuitry pulse signals produced upon avalanche breakdown of an ultraviolet radiation sensor.

Still another object of the invention is to provide novel and improved circuitry employing asymmetrically conductive control elements that are particularly useful in combustion supervision apparatus for providing a reliable indication of the presence or absence of flame in the supervised area.

In accordance with principles of the invention there is provided a radiation sensing system which includes a detector that may be disposed to sense ultraviolet radiation from the flame in a supervised combustion system for example. This detector is of the Geiger Mueller type in which an avalanche discharge occurs between spaced electrodes and is connected for energization through a transformer. In the preferred embodiment the transformer employed is an autotransformer having an iron core, but a conventional two winding transformer also may be utilized. A regulated secondary voltage is obtained through the employment of a primary circuit which has simulated series resonant characteristics provided by a capacitance connected in series with the primary winding. This circuitry provides a regulating effect so that the output voltage applied across the detector device in high impedance condition is maintained constant over a relatively wide range of input voltages. With the high impedance condition in the transformer secondary the primary circuit is effectively tuned at line frequency (sixty cycles in the preferred embodiment) so that the input impedance is about 700 ohms and a fixed output voltage is provided for input voltages between 90 and 130 volts. At this simulated series resonance condition the core of the transformer is saturated and variation of voltage over this range is insufficient to cause the core to desaturate. When the detector tube breaks down, a heavy current flows in the secondary transformer, collapsing the flux in the core and also reflecting a low impedance into the primary circuit so that the tuned circuit becomes mismatched with sharp reduction in the amount of voltage applied to the secondary. This reduced voltage causes the breakdown condition in the tube to be quenched, which quenching restores the high impedance condition in the secondary circuit and in turn restores the resonant condition in the transformer primary circuit so that the regulated voltage condition is re-established.

Also employed in this circuitry is a signal sensing network which employs an inductor which has low impedance to signals of line frequency and thus couples substantially no signal of that frequency to the output network, and relatively high impedance to signal pulses having rise times corresponding to a frequency in the order of 3 kc. The output signal from the inductor is applied to a filter and storage network for controlling an asymmetrically conductive switch. In the preferred embodiment the control circuit includes a diode connected in series with the control electrode of the switch and provides more accurate and reliable control of the actuation of the switch by the storage network.

The invention provides an improved radiation detection and readout circuit particularly useful for reliably supervising the existence of flame in a combustion control system. Other objects, features and advantages of the invention will be seen as the following description of a preferred embodiment progresses, in conjunction with the drawing, in which the single figure is a schematic diagram of radiation detection circuitry constructed in accordance with the invention.

With reference to the single figure of the drawing, a 120 volt energizing signal is applied at terminals 10, 12. Connected in circuit with the terminals 10, 12 is a capacitor 14 and an autotransformer 16 having a core 17 on which is wound a single winding 18 having a primary winding portion 19 proportioned in one to six ratio to the entire winding. Connected across the entire winding 18 is a radiation detector 20 having two spaced symmetrical electrodes 22, 24 of material that is photoemissive in response to radiation of the wavelengths of interest. In the case of ultraviolet radiation, tungsten is a preferred material. An ionizable gas, such as hydrogen, is disposed in the detector envelope with the electrodes 22, 24. A current limiting resistor 26 is connected in series with the secondary winding of the transformer and the detector 20.

The effective primary impedance of the transformer winding 19 is matched to the capacitive reactance of capacitor 14 to simulate a tuned circuit at 60 cycle frequency, which circuit has an impedance of about 700 ohms. In the preferred embodiment capacitor 14 has a value of 1.5 microfarads and the autotransformer resonant circuit arrangement steps up the 120 volt input to an output voltage applied to the detector electrodes of 800 volts (a value above that predictable by the turns ratio relation). Resistor 26 has a value of 470 ohms and serves to limit the current flowing in the transformer winding when an avalanche breakdown occurs between the tube electrodes. With a high load impedance at the 60 cycle line frequency the transformer core 17 is substantially completely saturated at any input voltage between 90 and 130 volts, and due to this saturated condition the output voltage is maintained constant. As indicated above, a two winding transformer may be utilized as well as the autotransformer winding, but as relatively high currents are carried in the secondary upon avalanche breakdown of a detector which necessitate relatively large current carrying capacity of the transformer secondary winding, some saving in space is afforded by the autotransformer configuration. This circuit maintains a substantially constant voltage across the tube electrodes when that tube is not in avalanche breakdown condition above a minimum necessary to produce photoemissive phenomena and below a value at which the gas will break down in the absence of radiation so that the desired radiation sensitivity is maintained without the production of spontaneous avalanche breakdown conditions.

While the tube is in de-ionized condition a high impedance condition exists which is reflected into the transformer primary circuit, maintaining it in tuned condition so that the energy supplied from the power source is principally used to maintain a high flux density in the core 17, which high flux density serves as a source for current when the secondary sees a low impedance. When ionization of the gas fill occurs between the tube electrodes 22, 24, the tube 20 presents a very low impedance in the secondary circuit and a heavy electric current flows with accompanying collapse of the established flux in transformer core 17. This current is limited substantially only by the resistance of the secondary winding (and the current limiting resistance 26, if any), the coupling between the secondary winding and the magnetic core 17 of the transformer, and the theoretical maximum rate of change of flux ($dq/dt$). This low impedance caused by tube 20 firing is reflected into the primary with similar sharp reduction so that the resonant condition in the primary circuit is destroyed and the energy from the power source, instead of replenishing the core flux, charges the series capacitor 14 to substantially the full line voltage peak with a sharp reduction in the voltage drop across the primary winding (to about 10% of the voltage drop that occurred there when the primary circuit was in resonant condition). Due to this non-resonant condition in the primary circuit the secondary voltage rapidly falls to a value insufficient to support avalanche discharge across the tube electrodes so that a quenching action occurs independent of the supply voltage passing through a zero value, and quenching of the tube in this embodiment normally occurs before the supply voltage passes through the zero value. As the high impedance condition of the detector tube is restored upon termination of the avalanche condition, the resonant condition of the transformer primary circuit is then recreated so that the magnetic flux condition and the tube's ultraviolet sensitivity can be re-established in the next half cycle of the power supply signal.

In the next half cycle, which is of opposite polarity, the capacitor 14 is discharged and the two potentials add vectorially to produce a high current spike in the primary circuit, which aids the re-establishment of the energy reservoir flux in the core 17. Also connected in series in the primary circuit are two inductors 30, 32. In the preferred embodiment these inductors are wound on a common ferrite core 34 so that each winding has a D.C. resistance of less than one ohm and an inductance value of approximately 0.75 millihenry. Each coil has a Q of approximately 20 at 3 kilocycles. When an avalanche discharge takes place, the current pulse is reflected into the primary circuit and a current pulse flows through the coils 30, 32 which has a high rise wave front such that the high Q inductors respond to this signal, producing a substantial voltage drop thereacross. The pulse occurring in the next half cycle, due to the capacitor discharge, also has higher than line frequency components and the high Q inductors also respond to it. Since these current pulses may be of either polarity, the output signals are coupled from the inductors by means of diodes 36, 38 relative to a common center tap 40.

The two diodes are connected to a common terminal 42 of a filter and integrating network and the center tap 40 is connected to terminal 44 of the network. That filter includes capacitors 46, 48, a resistor 50 and a sensitivity adjusting resistor 52. This network acts as a decoupling filter and flame indication signals are stored on capacitor 48. This charge is applied to the discharge network which includes diode 54, a variable resistor 56 and a fixed resistor 58. The tap 60 of the variable resistor 56 is connected to the cathode gate 62 of controlled rectifier 64 (type 3N58).

The controlled rectifier 64 is connected to control the energization of a condition indicating (flame relay) circuit solenoid coil 66, across which is connected in series resistor 68 and capacitor 70. This circuit is energized for A.C. operation through a transformer 72 which has a primary winding 74 which is energized from the same 120 volt A.C. source supplied at terminals 10, 12 and a secondary winding 76 which supplies power to operate the relay 66 as controlled by the rectifier switch 64. A one volt D.C. bias is applied to the circuitry of the cathode gate 62 through transformer secondary winding 78 and diode 80. Capacitor 82 isolates the signal circuit from the bias circuit.

Capacitor 70 functions to hold in relay 66 during those cycle portions where the switch 64 is not conductive due to the polarity reversal of the voltage supplied by secondary 76 and resistor 68 prevents damage to the switch 64 when the capacitor 70 is completely discharged.

The component values in the filter, discharge and indicating networks in this embodiment are selected so that the relay controlled by coil 66 is not picked up or held in unless detector tube avalanches are occurring at a rate of at least three per second. The initial charge of capacitor 46 is bled off through resistor 50 and imposes a charge on capacitor 48 in a time delay operation. The charge is also subjected to a voltage dividing action by virtue of the resistors 56 and 58. Therefore, unless the current pulses applied to capacitor 46 occur at consistent and reasonably short intervals the charge on capacitor 48 will not apply a potential high enough on control electrode 62 to allow the rectifier switch 64 to fire and energize the relay 66. Diode 54 controls current flow from the control electrode 62 of the rectifier switch 64 after it is turned on. There is a current flow into the control electrode 62 initially to turn the rectifier switch on but after the rectifier switch is turned on a current flow occurs in the opposite direction, and in the absence of the diode or other asymmetrically conductive circuit element this current flow will affect the charge on capacitor 48 and distort the stored charge indicative of the flame condition in the supervised area.

Thus there is provided novel radiation detection circuitry utilizing an avalanche discharge type of detector. Critical electrical voltage requirements for detector operational sensitivity and quenching ability after avalanche are provided by a constant voltage transformer arrangement operative over a range which satisfies Underwriters' requirements for temperature control units—that is satisfactory operation over the range 15% below rated line voltage to 10% above rated line voltage. With this circuitry the entire region for satisfactory operation of avalanche discharge tubes is covered plus margins for circuit changes, due to aging for example, which might affect the reliable operation of the detector system. The readout circuitry includes an output coupling network employing inductive components, a filter network and a discharge network to control a rectifier switch for operation of the flame or other condition indicating relay. While a preferred embodiment of the invention has been shown and described, various modifications thereof will be apparent to those skilled in the art, and therefore it is not intended that the invention be limited to the disclosed embodiment or to details thereof and departures may be made therefrom within the spirit and scope of the invention as defined in the claims.

We claim:

1. Condition sensing apparatus comprising a condition sensor of the avalanche discharge type having a pair of electrodes mounted in spaced relation within an envelope transparent to radiation,
   a voltage step up transformer having a primary winding element and a secondary winding element inductively coupled together,
   said secondary winding element being connected in series with the electrodes of said condition sensor,
   a capacitive element connected in series circuit with said primary winding element to simulate a resonant circuit at line frequency,
   means to connect alternating current supply means to energize said primary winding element and induce a high voltage signal in said secondary winding element for application to said electrodes to establish a high voltage electric field between said spaced electrodes,
   and means sensitive to the change of current flow in said primary winding element when the high voltage electric field between said spaced electrodes breaks down in avalanche discharge to provide a signal of such breakdown.

2. Condition sensing apparatus comprising a condition sensor of the avalanche discharge type having a pair of electrodes mounted in spaced relation within an envelope transparent to radiation,
   a voltage step up transformer having a primary winding element and a secondary winding element inductively coupled together,
   said secondary winding element being connected in series with the electrodes of said condition sensor,
   a capacitive element connected in circuit with said primary winding element to simulate a resonant circuit at line frequency,
   means to connect alternating current supply means to energize said primary winding element and induce a high voltage signal in said secondary winding element for application to said electrodes to establish a high voltage electric field between said spaced electrodes,
   and an inductance which has a high Q value at a frequency several times that of the alternating current supply means,
   said inductance being connected in series with said primary winding element for coupling pulse signals in response to avalanche breakdown of said sensor as reflected to said primary winding element from said secondary winding element to provide a signal of such breakdown.

3. Condition sensing apparatus comprising a condition sensor of the avalanche discharge type having a pair of electrodes mounted in spaced relation within an envelope transparent to radiation,
   a voltage step up autotransformer having a primary winding element and a secondary winding element inductively coupled together,
   said secondary winding element being connected in series with the electrodes of said condition sensor,
   a capacitive element connected in circuit with said primary winding element to simulate a resonant circuit at line frequency,
   means to connect alternating current supply means to energize said primary winding element and induce a high voltage signal in said secondary winding element for application to said electrodes to establish a high voltage electric field between said spaced electrodes,
   and means sensitive to the change of current flow in said primary winding element when the high voltage electric field between said spaced electrodes breaks down in avalanche discharge to provide a signal of such breakdown.

4. Condition sensing apparatus comprising a condition sensor of the avalanche discharge type having a pair of electrodes mounted in spaced relation within an envelope transparent to radiation,
   a voltage step up transformer having a primary winding element and a secondary winding element inductively coupled together,
   said secondary winding element being connected in series with the electrodes of said condition sensor,
   a capacitive element connected in circuit with said primary winding element to simulate a resonant circuit at line frequency,
   means to connect alternating current supply means to energize said primary winding element and induce a high voltage signal in said secondary winding element for application to said electrodes to establish a high voltage electric field between said spaced electrodes,
   means sensitive to the change of current flow in said primary winding element when the high voltage electric field between said spaced electrodes breaks down in avalanche discharge to provide a signal of such breakdown, and
   indicating circuitry connected to said current sensitive means including an integrating network including a capacitor and an indicating network,
   a controlled rectifier connected in said indicating network for controlling its energization,
   said controlled rectifier having a control electrode,
   and means connected in circuit between said integrating network and said control electrode for preventing current flow from said control electrode to said integrating network when said rectifier is turned on.

5. Radiation sensing apparatus comprising a radiation sensor of the avalanche discharge type having a pair of photoemissive electrodes mounted in spaced relation within an envelope transparent to radiation,
   an ionizable gas in said envelope,
   a voltage step up transformer having a primary winding element and a secondary winding element inductively coupled together,
   said secondary winding element being connected in series with the electrodes of said radiation sensor,
   a capacitive element connected in series with said primary winding element to simulate a resonant circuit at line frequency,
   means to connect alternating current supply means to energize said primary winding element and induce a high voltage signal in said secondary winding element for application to said electrodes to establish a high voltage electric field between said spaced electrodes,
   and an inductance connected in series with primary winding element,
   said inductance presenting a low impedance to line freqency signals and a higher impedance to pulse signals occurring when said radiation sensor switches from a high impedance condition to a low impedance condition in avalanche discharge, coupling means for coupling an output signal from said inductance, and indicating circuitry responsive to said output signal from said inductance for providing an indication of the sensed condition.

6. Radiation sensing apparatus comprising a radiation sensor of the avalanche discharge type having a pair of photoemissive electrodes mounted in spaced relation within an envelope transparent to radiation, an ionizable gas in said envelope, a voltage step up transformer having a primary winding element and a secondary winding element inductively coupled together, said secondary winding element being connected in series with the electrodes of said radiation sensor, a capacitance element connected in series with said primary winding element to simulate a resonant circuit at line frequency, means to connect alternating current supply means to energize said primary winding element and induce a high voltage signal in said secondary winding element for application to said electrodes to establish a high voltage electric field between said spaced electrodes, and means sensitive to the change of current flow in said primary winding element when the high voltage electric field between said spaced electrodes breaks down in avalanche discharge to provide a signal of such breakdown.

7. The apparatus as claimed in claim 5 wherein said transformer is an autotransformer.

8. Radiation sensing apparatus comprising a radiation sensor of the avalanche discharge type having a pair of photoemissive electrodes mounted in spaced relation within an envelope transparent to radiation, an ionizable gas in said envelope, a voltage step up transformer having a saturable core, a primary winding element and a secondary winding element inductively coupled together on said saturable core, said secondary winding element being connected in series with the electrodes of said radiation sensor, a capacitance element connected in series with said primary winding element to simulate a resonant circuit at line frequency when a high impedance load is connected to said transformer secondary winding element, means to connect alternating current supply means to energize said primary winding element and induce a high voltage signal in said secondary winding element for application to said electrodes to establish a high voltage electric field between said spaced electrodes, and readout circuitry including an impedance connected in series with said primary winding element and said alternating current supply connection means for supplying an output signal in response to said radiation sensor switching from a high impedance condition to a low impedance condition in avalanche discharge.

9. In condition sensing equipment utilizing an avalanche discharge type of condition sensor, the combination of a transformer having a primary circuit and a secondary circuit, a capacitance connected in series with said primary circuit, said avalanche discharge sensor connected in said secondary circuit as the transformer load, said sensor constituting a high impedance when no avalanche discharge is occurring within said sensor and a low impedance when avalanche discharge is occurring within said sensor, the reactance of said primary circuit when said sensor is in said high impedance condition forming a resonant circuit with the reactance of said capacitance at line frequency, and the reactance of said primary circuit when said sensor is in said low impedance condition forming a non-resonant circuit with the reactance of said capacitance, means to supply electrical energy at line frequency to said series circuit of said capacitance and said primary to energize said transformer to apply a conditioning potential to said sensor during its high impedance condition, said conditioning potential rapidly falling upon occurrence of avalanche discharge to a level below that required to sustain the discharge with a large pulse of current flow in said secondary circuit, and means in said primary circuit to sense the deviation from steady-state circuit conditions occurring upon avalanche discharge.

10. In combustion supervision apparatus an avalanche discharge type of flame sensor, a transformer having a saturable core, a primary winding on said saturable core and a secondary winding inductively coupled to said primary winding on said saturable core, a capacitance connected in series with said primary winding, said flame sensor connected in said secondary circuit as the transformer load, said sensor constituting a high impedance when no avalanche discharge is occurring within said sensor and a low impedance when avalanche discharge is occurring within said sensor, the reactance of said primary when said sensor is in said high impedance condition forming a resonant circuit with the reactance of said capacitance at line frequency, and the reactance of said primary when said sensor is in said low impedance condition forming a non-resonant circuit with the reactance of said capacitance, means to supply electrical energy at line frequency to said series circuit of said capacitance and said primary to energize said transformer to apply a constant conditioning potential to said sensor during its high impedance condition, said conditioning potential rapidly falling upon occurrence of avalanche discharge to a level below that required to sustain the discharge with a large pulse of current flow in said secondary circuit supplied by collapsing flux in said saturable core, and means in said primary circuit to sense the deviation from steady-state circuit conditions occurring upon avalanche discharge.

11. The apparatus as claimed in claim 10 wherein said deviation sensing means includes a pair of inductances connected in series with said primary winding element, said inductances presenting a low impedance to line frequency signals and a higher impedance to pulse signals occurring when said radiation sensor switches from said high impedance condition to said low impendance condition in avalanche discharge, diode coupling means for coupling an output signal from said inductances, and indicating circuitry responsive to said output signal from said inductances for providing an indication of the sensed flame condition.

12. The apparatus as claimed in claim 10 wherein said deviation sensing means includes a charge storage capacitor, means to apply said output signal to said capacitor, an indicating network including an alternating current energizing source, an output device and a controlled rectifier connected in circuit with said source and said device for controlling the energization of said device, said controlled rectifier having a control electrode and circuit means connecting said charge storage capacitor, and said control electrode including asymmetrically conductive means connected in circuit between said capacitor and said control electrode for preventing current flow from said control electrode to said capacitor when said rectifier becomes conductive in response to an electric potential applied to said control electrode from said capacitor.

13. The apparatus as claimed in claim 10 wherein said transformer is an autotransformer.

14. The apparatus as claimed in claim 10 wherein said flame sensor comprises two electrodes of photoemissive material housed in an evacuable envelope transparent to ultraviolet radiation, said electrodes being uniformly spaced to define a working region, and a gas in said envelope such that ultraviolet radiation impinging on said electrodes when said constant conditioning potential is applied thereto causes an electron to be emitted by the electrode to initiate an avalanche breakdown of said gas between said electrodes.

15. Radiation sensing apparatus comprising a radiation sensor of the avalanche discharge type having a pair of photoemissive electrodes mounted in spaced relation within an envelope transparent to radiation, an ionizable gas in said envelope, a voltage step up transformer having a primary winding element and a secondary winding element inductively coupled together, said secondary winding element being connected in series with the electrodes of said radiation sensor, a capacitive element connected in series with said primary winding element to simulate a resonant circuit at line frequency, means to connect alternating current supply means to energize said primary winding element and induce a high voltage signal in said secondary winding element for application to said electrodes to establish a high voltage electric field between said spaced electrodes, a pair of inductances connected in series with said primary winding element, said inductances presenting a low impedance to line frequency signals and a higher impedance to pulse signals occurring when said radiation sensor switches from said high impedance condition to said low impedance condition in an avalanche discharge, diode coupling means for coupling an output signal from said inductances, and indicating circuitry responsive to said output signal from said inductances for providing an indication of the sensed flame condition.

16. Radiation sensing apparatus comprising a radiation sensor of the avalanche discharge type having a pair of photoemissive electrodes mounted in spaced relation within an envelope transparent to radiation, an ionizable gas in said envelope, a voltage step up transformer having a primary winding element and a secondary winding element inductively coupled together, said secondary winding element being connected in series with the electrodes of said radiation sensor, a capacitive element connected in series with said primary winding element to simulate a resonant circuit at line frequency, means to connect alternating current supply means to energize said primary winding element and induce a high voltage signal in said secondary winding element for application to said electrodes to establish a high voltage electric field between said spaced electrodes, a pair of inductances connected in series with said primary winding element, said inductances presenting a low impedance at line frequency signals and a higher impedance to pulse signals occurring when said radiation sensor switches from said high impedance condition to said low impedance condition in an avalanche discharge, diode coupling means for coupling an output signal from said inductances, an indicating network including an alternating current energizing source, an output device and a controlled rectifier connected in circuit with said source and said device for controlling the energization of said device, said controlled rectifier having a control electrode and circuit means energizing said charge storage capacitor, and said control electrode including asymmetrically conductive means connected in series between said capacitor and said control electrode for preventing current flow from said control electrode to said capacitor when said rectifier becomes conductive in response to an electric potential applied to said control electrode from said capacitor.

17. In condition sensing equipment utilizing an avalanche discharge device having two spaced electrodes, means to apply electrical energy to said avalanche discharge device to establish an electric field between said electrodes, said device having a high impedance condition when said electrical energy is applied to said device in the absence of avalanche discharge conditions and a low impedance in the presence of avalanche discharge conditions, and signal pickoff means comprising two reactive circuit elements connected in series between said energy applying means and said device, said reactive circuit elements having a high quality factor to discriminate between line frequency background current flowing through said element when said device is in said high impedance condition and short period higher frequency avalanche current flowing through said element which is produced in response to the switching of said device from said high impedance condition to said low impedance condition to thus provide a high avalanche discharge condition to steady-state condition signal ratio.

18. In condition sensing equipment utilizing an avalanche discharge device having two spaced electrodes, means to apply electrical energy to said avalanche discharge device to establish an electric field between said electrodes, said device having a high impedance condition when said electrical energy is applied to said device in the absence of avalanche discharge conditions and a low impedance in the presence of avalanche discharge conditions, and signal pickoff means comprising two reactive circuit elements connected in series between said energy applying means and said device, said reactive circuit elements having a high quality factor to discriminate between line frequency background current flowing through said element when said device is in said high impedance condition and short period higher frequency avalanche current flowing through said element which is produced in response to the switching of said device from said high impedance condition to said low impedance condition to thus provide a high avalanche discharge condition to steady-state condition signal ratio, a common output terminal between said two reactive elements, a diode connected to the end of each reactive element opposite said common output terminal, said diodes being poled in the same direction and being connected together at a second output terminal.

References Cited by the Examiner

UNITED STATES PATENTS

| | | | |
|---|---|---|---|
| 2,621,239 | 12/1952 | Cade et al. | 250—83.3 X |
| 3,012,146 | 12/1961 | Hamelink | 250—83.6 |
| 3,041,458 | 6/1962 | Roxberry | 250—83.3 |
| 3,050,625 | 8/1962 | Wesley | 250—83.6 X |
| 3,103,589 | 9/1963 | Howling | 250—83.3 X |

RALPH G. NILSON, *Primary Examiner.*

ARCHIE R. BORCHELT, *Examiner.*